(12) United States Patent
Lenchik et al.

(10) Patent No.: US 7,257,430 B2
(45) Date of Patent: Aug. 14, 2007

(54) SELF CONFIGURING MULTIPLE ELEMENT PORTABLE ELECTRONIC DEVICE

(75) Inventors: Vitaly Lenchik, Lake Zurich, IL (US); Casey Hill, Crystal Lake, IL (US); David Kilp, North Juno Beach, FL (US); Kevin Baker, Twin Lakes, WI (US); John Jennings, Libertyville, IL (US); Tong Jin Kim, Chicago, IL (US); Michael D. Prince, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 445 days.

(21) Appl. No.: 10/144,406

(22) Filed: May 11, 2002

(65) Prior Publication Data

US 2004/0203485 A1 Oct. 14, 2004

(51) Int. Cl.
*H04M 1/00* (2006.01)
*G09G 1/00* (2006.01)

(52) U.S. Cl. ............... 455/575.3; 455/90.2; 455/550.1; 455/566; 345/168; 379/433.04

(58) Field of Classification Search ................ 345/173, 345/174, 175, 176, 177, 178, 167–169; 178/18.01–18.07; 455/550.1, 90.1–90.3, 414.1, 552.1, 566, 455/575.8, 433.01, 455.06, 433.07, 368, 455/556.1, 575.1–575.6, 556.2; 379/433.01, 379/433.04, 433.07, 433.11, 433.12
See application file for complete search history.

(56) References Cited

U.S. PATENT DOCUMENTS 4,747,122 A   5/1988 Bhagat et al.

D297,734 S   9/1988 Soren et al.

(Continued)

FOREIGN PATENT DOCUMENTS

EP   0 472 361   2/1992

(Continued)

OTHER PUBLICATIONS

Seth Malgieri, West Coast Firm Puts "Beep" Inside Cellular Telephone, Radio Communication Report Dec. 17, 1990 at 1, 22.

*Primary Examiner*—Charles N. Appiah
(74) *Attorney, Agent, or Firm*—David S. Noskowicz

(57) ABSTRACT

A self configuring multiple element portable electronic device (100) and method is provided. The device comprises at least a first electronic element (104) and a second electronic element (106) and a joint (112) connecting the first electronic element and the second electronic element, with the joint allowing movement in more than one plane of the first electronic element in relation to the second electronic element, wherein the self configuring multiple element portable electronic device is capable of self configuring an operational mode based on a relative position of the first electronic element with respect to the second electronic element. The method comprises the steps of detecting a relative position of the first electronic element relative to the second electronic element, and selecting an operational mode of the device based on the relative position. A keyboard having a plurality of keys has a first at least some of the keys active in a first mode of operation and in a second mode of operation a different set of keys, which are at least some of the first at least some of the keys are active.

25 Claims, 11 Drawing Sheets

U.S. PATENT DOCUMENTS

| | | | |
|---|---|---|---|
| D297,735 S | 9/1988 | Soren et al. | |
| D297,736 S | 9/1988 | Krolopp et al. | |
| D298,244 S | 10/1988 | Watanabe | |
| D300,742 S | 4/1989 | Soren et al. | |
| D300,827 S | 4/1989 | Soren et al. | |
| 4,845,772 A | 7/1989 | Metroka et al. | |
| D304,189 S | 10/1989 | Nagele et al. | |
| D305,427 S | 1/1990 | Soren et al. | |
| 4,899,368 A | 2/1990 | Krohn et al. | |
| 5,109,539 A | 4/1992 | Inubushi et al. | |
| D326,091 S | 5/1992 | Kikuchi | |
| D326,451 S | 5/1992 | Roegner | |
| D326,452 S | 5/1992 | Roegner | |
| 5,151,946 A * | 9/1992 | Martensson | 455/575.4 |
| 5,189,632 A * | 2/1993 | Paajanen et al. | 708/109 |
| 5,335,276 A | 8/1994 | Thompson et al. | |
| 5,337,346 A | 8/1994 | Uchikura | |
| 5,465,401 A | 11/1995 | Thompson | |
| 5,584,054 A | 12/1996 | Tyneski et al. | |
| 5,710,576 A | 1/1998 | Nishiyama et al. | |
| 5,715,524 A | 2/1998 | Jambhekar et al. | |
| 5,758,267 A * | 5/1998 | Pinder et al. | 455/90.2 |
| 5,797,089 A * | 8/1998 | Nguyen | 455/403 |
| 5,896,575 A | 4/1999 | Higginbotham | |
| 5,907,615 A * | 5/1999 | Kaschke | 379/433.12 |
| 5,949,408 A * | 9/1999 | Kang et al. | 345/169 |
| 6,014,573 A | 1/2000 | Lehtonen et al. | |
| 6,047,196 A * | 4/2000 | Makela et al. | 455/556.1 |
| 6,115,616 A | 9/2000 | Halperin et al. | |
| 6,144,358 A * | 11/2000 | Narayanaswamy et al. | 345/102 |
| 6,151,485 A * | 11/2000 | Crisp | 455/575.4 |
| 6,249,672 B1 | 6/2001 | Castiel | |
| 6,332,084 B1 * | 12/2001 | Shaanan et al. | 455/566 |
| 6,349,040 B2 * | 2/2002 | Lefort | 361/814 |
| 6,385,463 B1 | 5/2002 | Lieberman et al. | |
| 6,549,789 B1 * | 4/2003 | Kfoury | 455/550.1 |
| 6,580,932 B1 * | 6/2003 | Finke-Anlauff | 455/566 |
| 6,658,272 B1 * | 12/2003 | Lenchik et al. | 455/575.1 |
| 6,661,404 B1 * | 12/2003 | Sirola et al. | 345/168 |
| 6,744,890 B1 * | 6/2004 | Le et al. | 379/433.07 |
| 6,747,635 B2 * | 6/2004 | Ossia | 345/169 |
| 6,781,587 B2 * | 8/2004 | Grigor | 345/533 |
| 6,798,882 B2 * | 9/2004 | Kupiainen | 379/433.04 |
| 6,801,796 B2 * | 10/2004 | Finke-Anlauff | 455/575.3 |
| 6,999,804 B2 * | 2/2006 | Engstrom et al. | 455/575.3 |
| 2003/0044000 A1 * | 3/2003 | Kfoury et al. | 379/433.04 |

FOREIGN PATENT DOCUMENTS

| | | |
|---|---|---|
| EP | 0 678 987 | 10/1995 |
| JP | 4-152724 | 5/1992 |
| JP | 5-91022 | 4/1993 |
| JP | 6-164440 | 1/1994 |
| WO | WO98/19434 | 5/1998 |

* cited by examiner

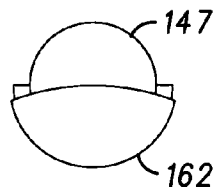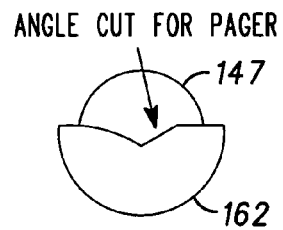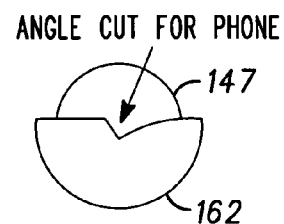
*FIG.16*   *FIG.17*   *FIG.18*
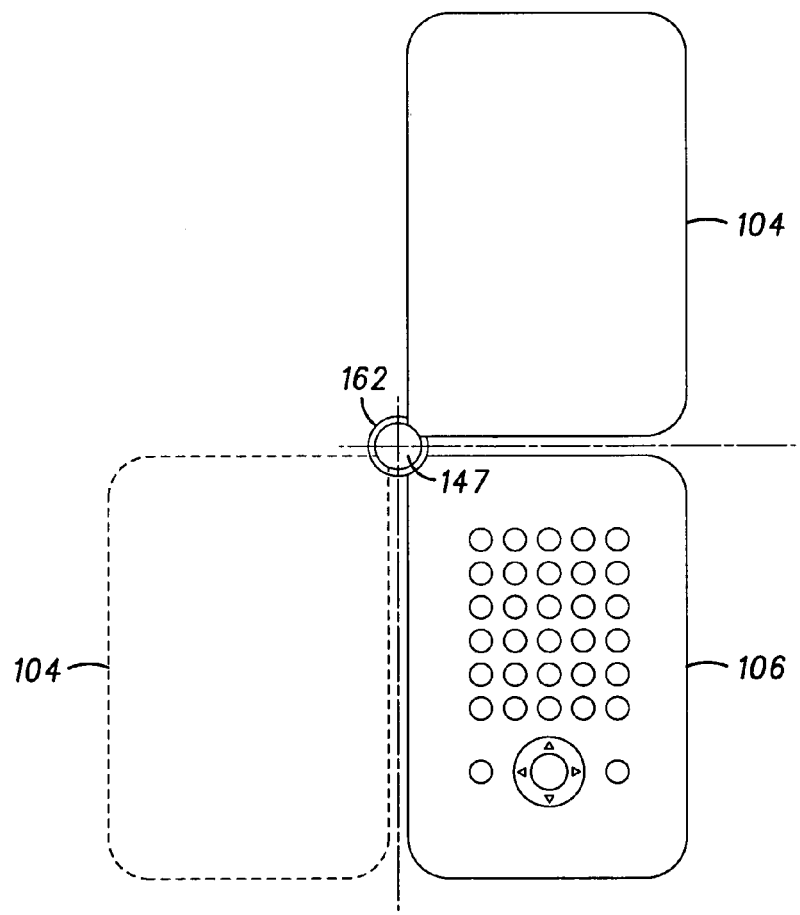
*FIG.19*

SELF CONFIGURING MULTIPLE ELEMENT PORTABLE ELECTRONIC DEVICE

BACKGROUND OF THE INVENTION

The present invention relates generally to portable electronic devices, and more particularly to portable electronic devices having multiple elements.

Many portable electronic devices exist that are designed for making life easier and more productive. Devices such as cellular phones, pagers, and personal digital assistants (PDAs) perform valuable functions such as communications, messaging, data storage and recall, etc.

These portable electronic devices often have two parts, a hinged cover having a display and a body having a keyboard. The display is typically chosen to match the intended purpose. For example, PDAs typically have a relatively large display, useful for displaying text and graphics. Cellular phones, on the other hand, typically have smaller displays designed for displaying a limited number of alphanumeric characters. This makes sense, as production costs may be kept down by including only the required capabilities in the device.

More and more, people find such portable electronic devices to be invaluable for keeping in touch with co-workers, family, and friends, and for organizing a busy lifestyle. As the demand for portable electronic devices increases, these devices tend to increase in functions, features, and complexity. However, such devices still tend to remain as distinct units due to the increased complexity and difficulty of use that often comes with integration of multiple devices.

Integration of multiple devices is understandably difficult, due to the need for providing different functions that intermesh operationally while sharing inputs, outputs, and other resources. This is further complicated by the need to create a device that is intuitively simple to use.

Non-integration of portable electronic devices produces several drawbacks. First, there are the obvious drawbacks such as needing multiple devices to accomplish all desired functions, along with the attendant size and weight inconvenience. Second, non-integration means that multiple devices have duplicate components, such as heavy and bulky displays, input devices, and power sources. Third, the increased use of microprocessors and their increasing capabilities allow devices to be developed that are flexible and can be configured to perform multiple functions. Fourth, integrating devices to share common components and to cooperatively function could provide increased value to consumers while reducing prices.

There remains a need in the art, therefore, for improvements in portable electronic devices.

Figure 20:
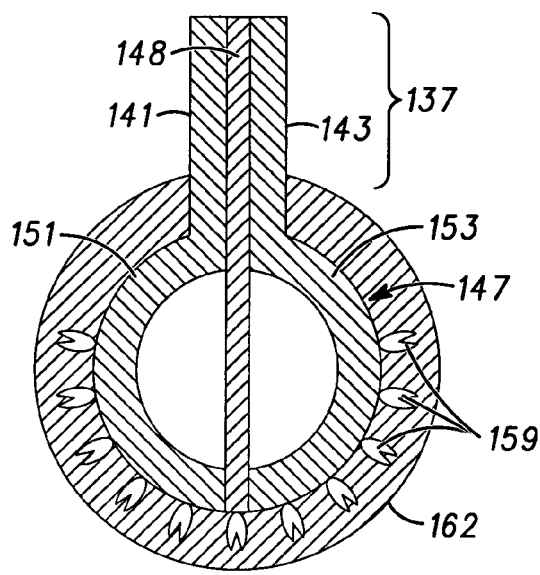
Figure 21:
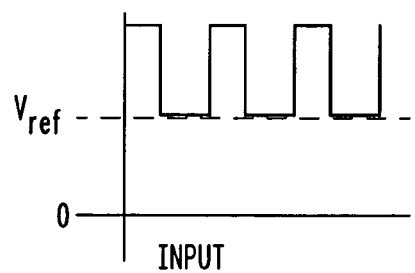
Figure 22:
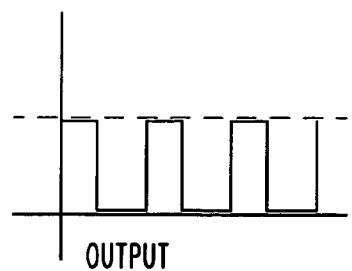
Figure 23:
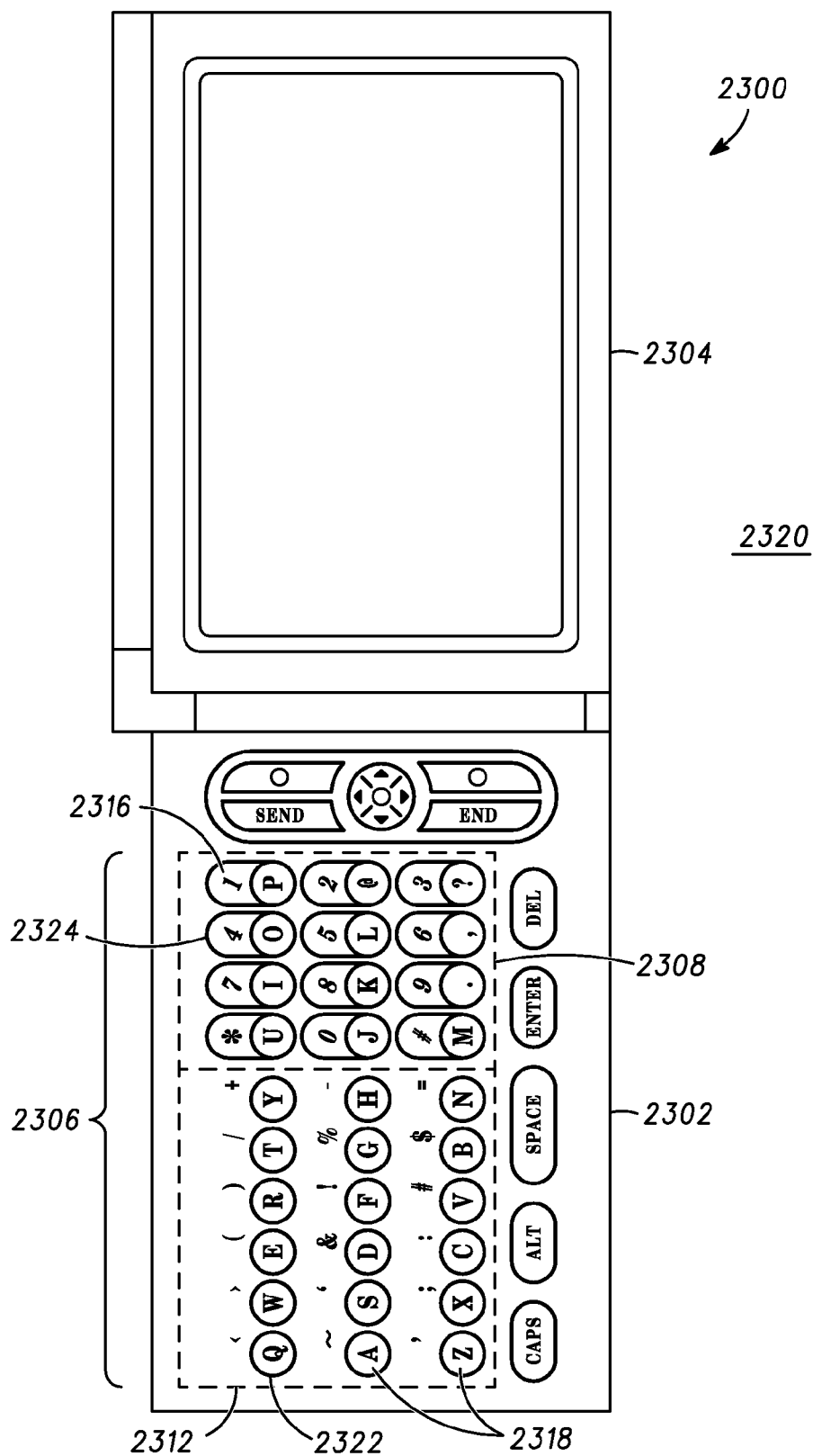
Figure 24:
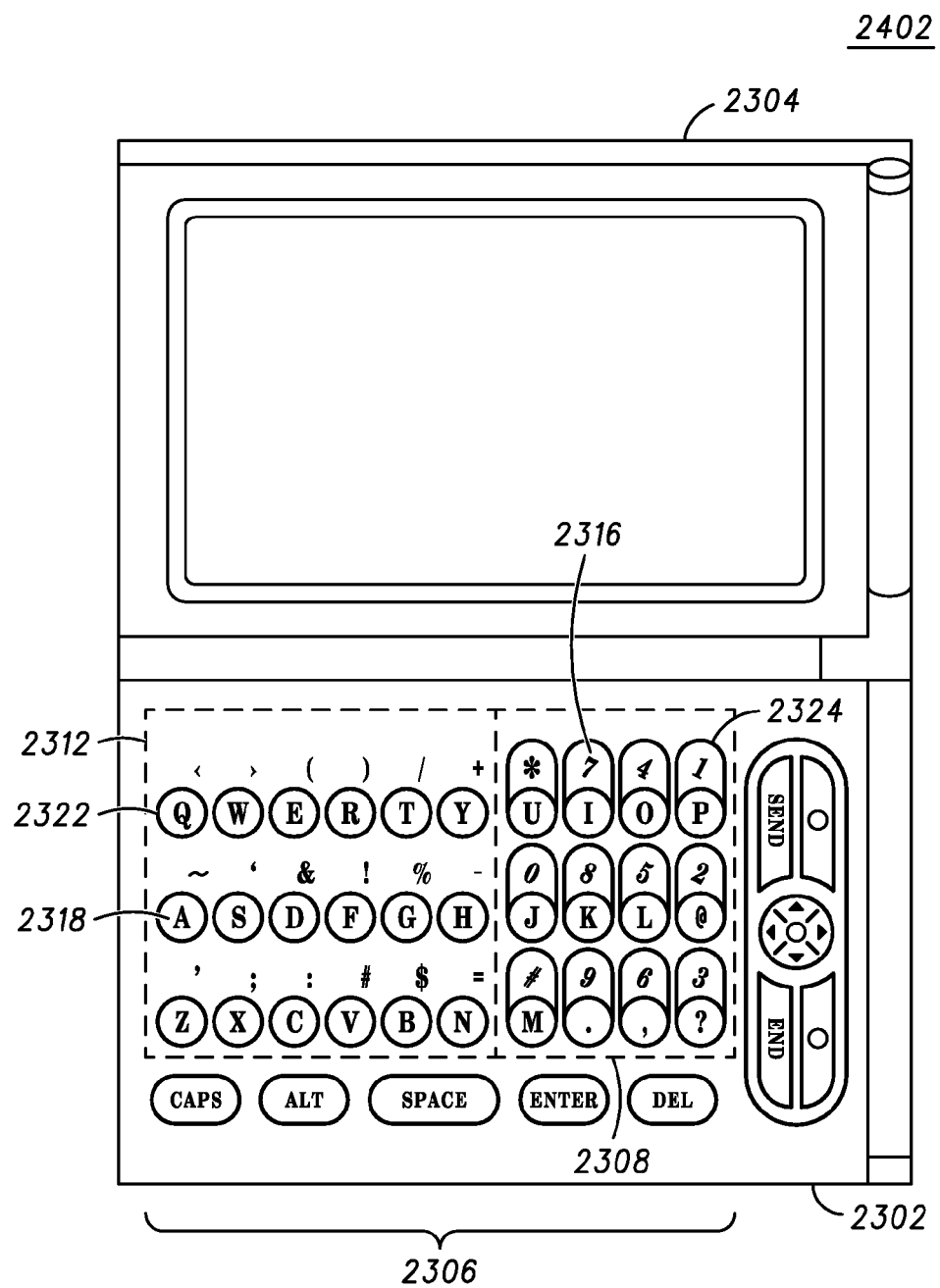

FIGS. show a second embodiment of the joint;

FIGS. 16-18 show detail of a socket of the second embodiment;

FIG. 19 shows two resulting predetermined positions of detents of the second embodiment;

FIG. 20 shows detail of the ball and the socket of the second embodiment;

FIG. 21 shows a graph of a communication signal superimposed on a power voltage; and FIG. 22 shows a digital communication signal removed from the power voltage;

FIG. 23 shows an exemplary view of the communication device in a first position;

FIG. 24 shows an exemplary view the communications device in a second exemplary position.

DETAILED DESCRIPTION OF THE PREFERRED EMBODIMENTS

A self configuring multiple element wireless portable electronic communication device is provided according to a first aspect of the invention. The device comprises at least a first electronic element and a second electronic element and a joint connecting the first electronic element and the second electronic element, with the joint allowing movement in more than one plane of the first electronic element in relation to the second electronic element, wherein the self configuring multiple element portable electronic device is capable of self configuring an operational mode based on a relative position of the first electronic element with respect to the second electronic element.

A self configuring multiple element wireless portable electronic communication device is provided according to a first aspect of the invention. The device comprises at least a first electronic element and a second electronic element, a shaft affixed to the first electronic element of the hand-held device and having at least two lengthwise electrical conductor elements separated by an electrical insulator material, a ball formed on an end of the shaft, and a socket formed on the second electronic element, the socket including a plurality of spring loaded contacts adapted to press against the ball, with the plurality of spring loaded contacts adapted to contact the at least two lengthwise electrical conductor elements and electrically communicate with the at least two lengthwise electrical conductor elements, wherein the ball and the socket allow movement in more than one plane of the first electronic element in relation to the second electronic element, and wherein the contacts form a sensor for detecting a relative position of the first electronic element relative to the second electronic element, and wherein the self configuring multiple element portable electronic device is capable of self configuring an operational mode based on a relative position of the first electronic element with respect to the second electronic element.

A method for self configuring an operational mode in a self configuring multiple element wireless portable electronic communication device having a first electronic element that may be moved in relation to a second electronic element is provided according to a third aspect of the invention. The method comprises the steps of detecting a relative position of the first electronic element relative to the second electronic element, and selecting an operational mode of the device based on the position.

Now turning to FIGS. 1-8 show a self-configuring multiple element wireless portable electronic communication device 100 having a first element 104 joined to a second element 106 by a joint 112. FIGS. 1-4 show a configuration sequence wherein the first element 104 and the second element 106 are manipulated to place the device 100 into a portrait configuration.

Figure 4:
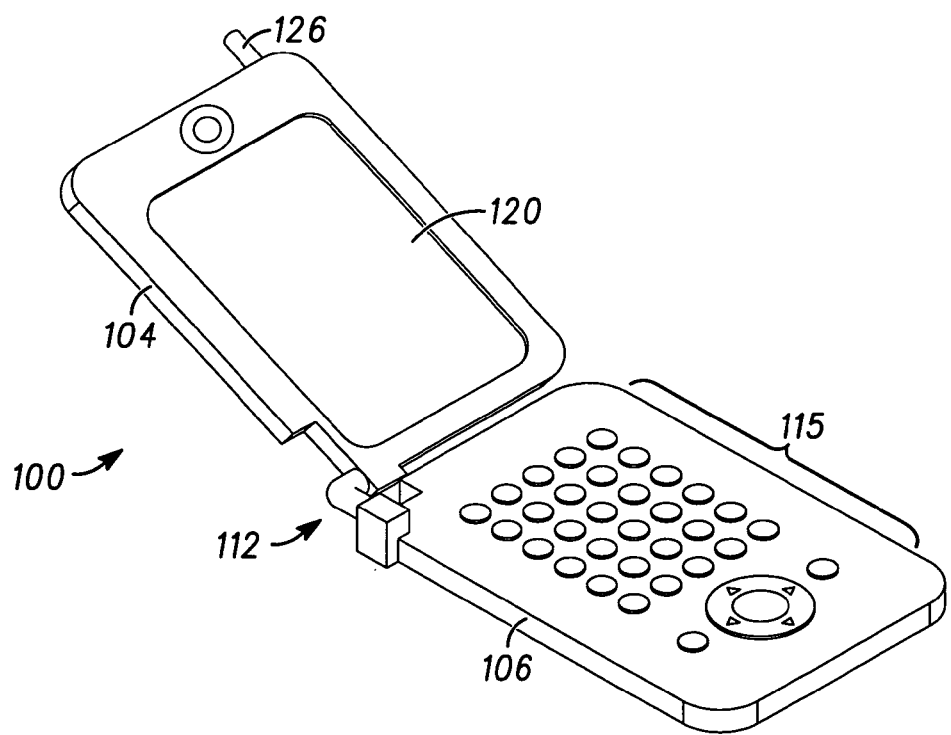
Figure 5:
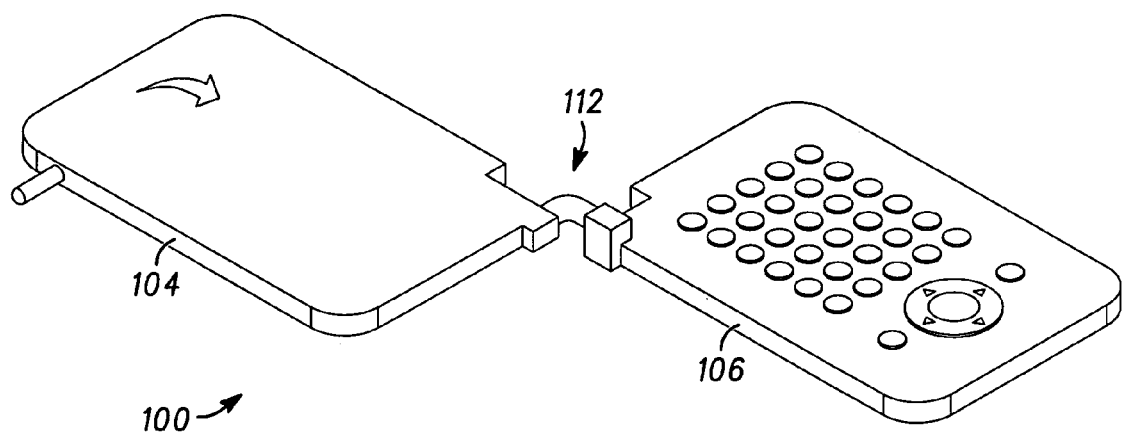
Figure 6:
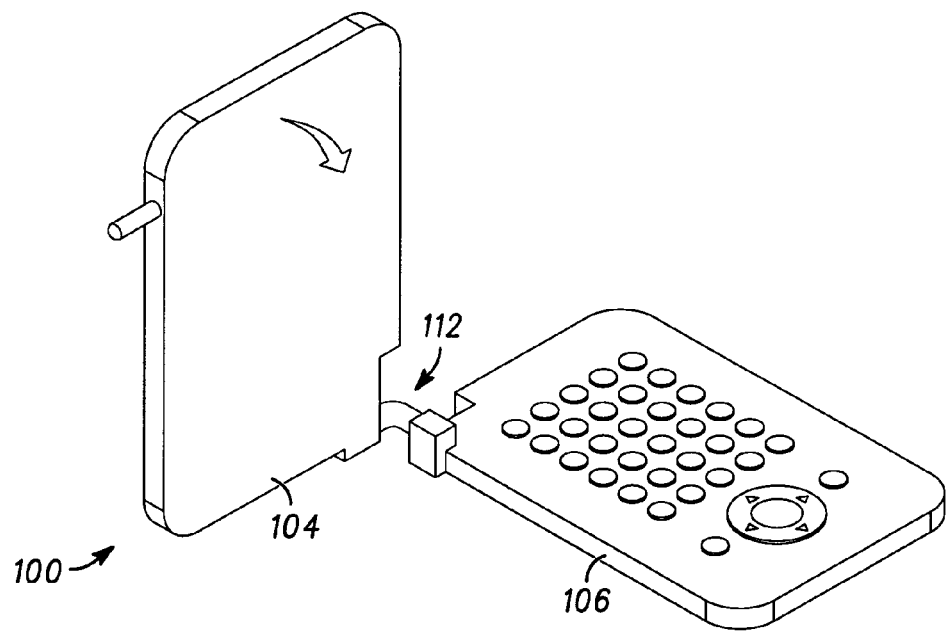

FIG. 4 shows a self-configuring device 100 when it is configured in a portrait configuration such as, for example, a cellular phone. A long dimension of the typically rectangular display 120 is vertically (or longitudinally) positioned when in use. Because the display 120 is therefore positioned like a portrait of a person, it is known as a portrait mode. The portrait configuration is also reflected in the inputs 115 of the second element 106, which may be configured to reflect the portrait mode and may include numeric keys and other phone keys. The first element 104 may be rotated down to a closed position parallel to and in contact with the second element 106 to assume a closed configuration (not shown). This is typical of a cellular phone wherein a body and a lid may be folded together and closed during non-use.

FIGS. 5-8 show a configuration sequence wherein the first element 104 and the second element 106 are manipulated to place the device 100 into a landscape configuration.

Figure 8:
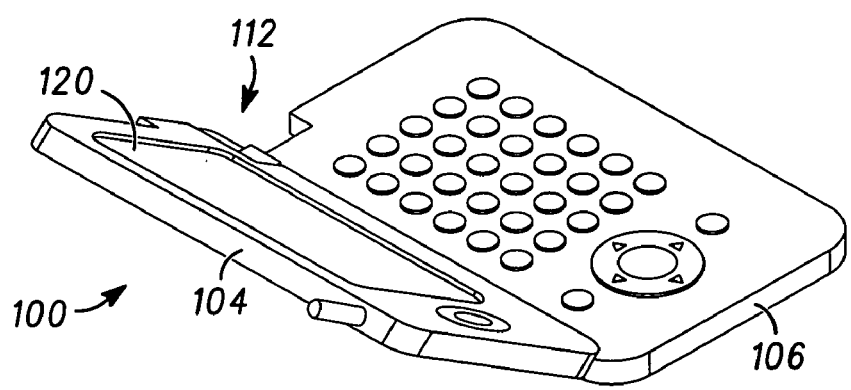

FIG. 8 shows the self-configuring multiple element portable electronic device 100 in a landscape configuration, such as, for example, a pager. In the landscape configuration, the display 120 has the long dimension in a substantially lateral position, as is the second element 106. This may also be appropriate for a device such as a PDA or other electronic appliances. Again, the first element 104 may be rotated down to a closed position parallel to and in contact with the second element 106 to assume a closed configuration (not shown).

Figure 9:
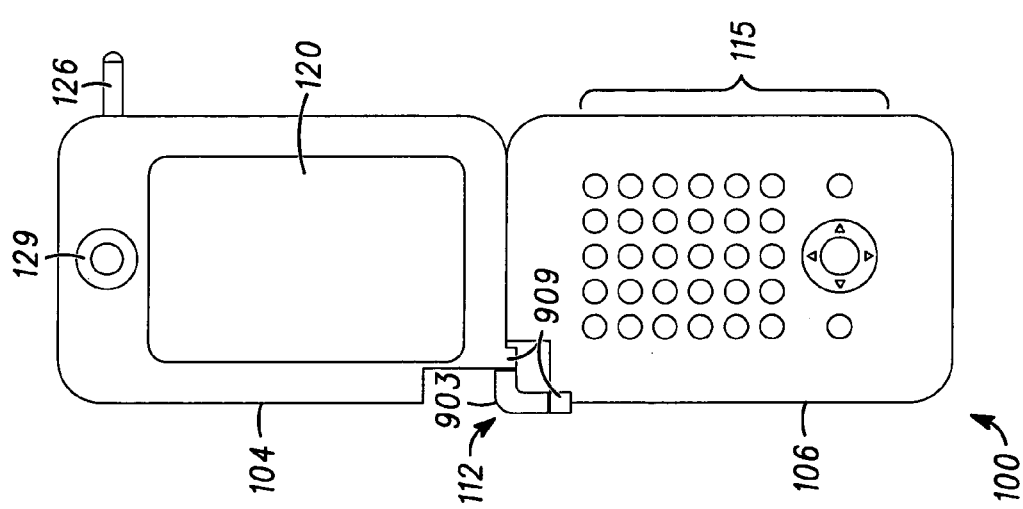
FIG. 9 shows various input and output devices and other features.

Referring now to FIG. 9, the various input and output devices and other features are discussed. In a typical configuration, the first element 104 contains a display 120. The display 120 may be any common display device, such as an LCD screen, a fluorescent display, a TFT display, or a CRT, for example. The display 120 in a cellular phone type configuration may be used to display phone related functions such as name and number storage, speed dial information, or phone control and operation settings, for example. In pager or PDA type operational modes, the display 120 may be used to provide a variety of graphics, images, text, or combinations thereof. The orientation of the display 120 may be self configured by the device 100 to match the overall orientation of the self-configuring multiple element portable electronic device 100.

Also included in the first element 104 may be an antenna 126 and a camera 129. The camera 129 is preferably a video camera, but alternatively may be a still digital camera. The antenna polarization may be modified to reflect the configuration (i.e., a horizontal polarization in the portrait mode and a vertical polarization in the landscape mode, for example).

The second element 106 may contain inputs 115 such as, for example, a keyboard. Alternatively, other input devices (not shown) may include a pointing device such as a joystick and buttons used on laptop or notebook computers, a track ball, a touch pad, a rocker switch, a touch screen, a TTY input device for disable persons, a braille key input, or a pad for handwriting pen, for example. The orientation of the inputs 115 will be self configured to match the overall orientation of the self-configuring multiple element portable electronic device 100.

The joint 112 joins the first element 104 to the second element 106 and allows the first element 104 to move with respect to the second element 106. This movement may be in two planes, unlike a typical cellular phone which consists of a body with a hinged cover that moves in only one plane.

Although the present invention is shown as having only two elements, it should be understood that the present invention also applies to portable electronic devices having three or more elements. In such cases, multiple joints 112 may be employed.

The joint 112 may optionally include one or more detents wherein a detent position provides a bias to hold the first element 104 in a predetermined position in relation to the second element 106. Two such detents are preferably located to provide the relative positions shown in FIGS. 4 and 8.

It can be seen from the figures that the joint 112 allows the first element 104 and the second element 106 to move with respect to each other, allowing various positions of the two elements. The joint 112 of the present invention also allows the device 100 to sense the relative positions of the first element 104 and the second element 106. Because of this ability to determine the relative positions, both the display device 120 and the inputs 115 may be configured by the portable electronic device 100 into either a landscape mode or a portrait mode.

In addition to the changing of the orientation of displayed graphics or text, the orientation and arrangement of the individual keys or input elements of the inputs 115 may also be modified. For example, in a portrait (cellular phone) mode the input keys may be arranged so that they are properly oriented when the portable electronic device 100 is in a vertical portrait position (see FIG. 4). In the landscape mode, the first element 104 and second element 106 are substantially parallel and horizontally positioned, and the input keys may be configured in a horizontal orientation (see FIG. 8).

Figure 1:
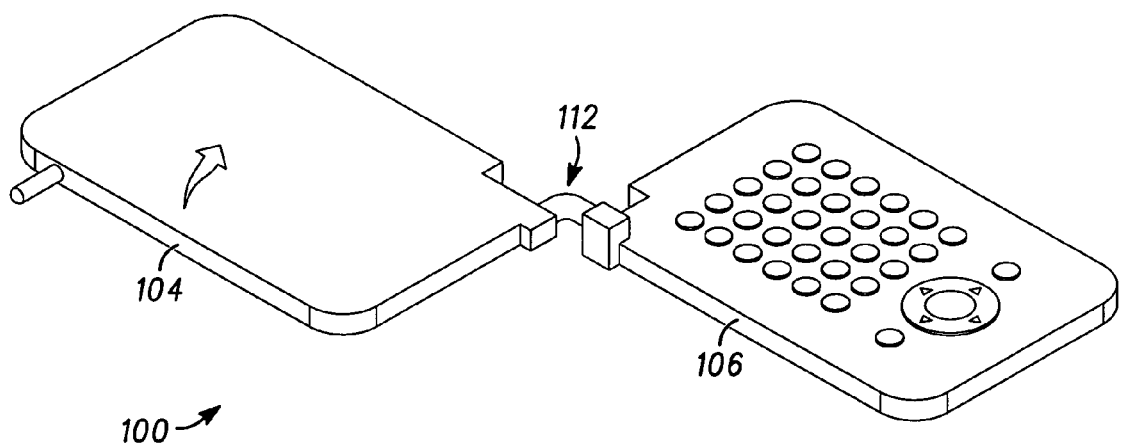
FIGS. 1-8 show a self-configuring multiple element wireless portable electronic communication device having a first element joined to a second element by a joint.
Figure 2:
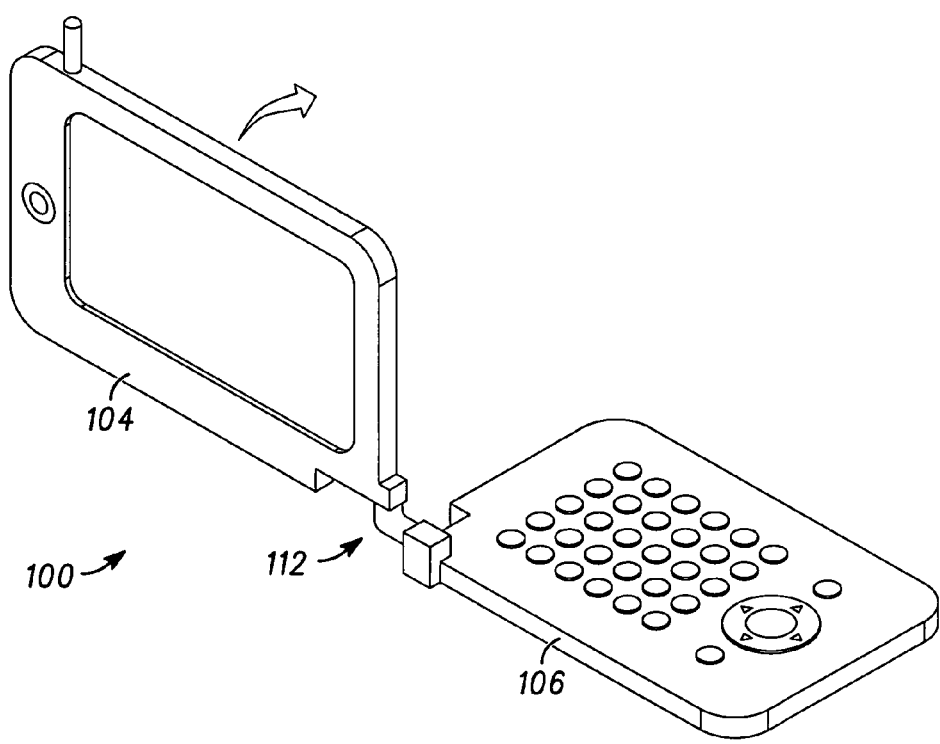

Although FIGS. 1-8 show both configurations starting from a similar initial configuration, it should be noted that the device 100 may be directly manipulated from one configuration to the other, without necessarily having to proceed to the configuration shown in FIG. 1.

The input keys may be reoriented by simply including multiple symbols or characters on each key (oriented in both portrait and landscape positions). Alternatively, the inputs 115 may include a touch-screen display that is capable of reconfiguring and reorienting the touch input regions and accompanying symbols and characters. A third alternative is the use of controllable backlighting, wherein symbols or characters are variably illuminated in a translucent or transparent input element or key. A fourth alternative is the use of electronic labels which contain symbols or characters that can be reconfigured and reoriented.

Likewise, other input and output devices, such as the camera 129 or an electronic handwriting tablet for use with a handwriting stylus, for example, may be self configured by the relative positions of the first element 104 and the second element 106. In addition the operation of the input device must have the proper orientation. Handwriting recognition software must know whether the handwriting tablet is in a landscape or portrait positions. The same is true for joysticks and other similar devices.

As an additional feature, the relative positions of the elements may also select a service to be received. For example, the user may position the two elements 104 and 106 to cause the portable electronic device 100 to self configure as a cellular phone and receive incoming phone calls. The portable electronic device 100 may include an alert that notifies the user that a non-selected service is waiting to be received, such as an incoming page in this example. The user may therefore reposition the elements of the device 100 in order to cause the device 100 to self configure as a pager, whereupon the incoming page may be received and/or responded to.

As a further feature, altering the operational configuration and mode of the device 100 may be useful in conserving battery life. Some operational modes, chosen by the user, may consume less battery life, given screen activity, screen size, or non real-time synchronous message versus real-time messaging (i.e., paging versus telephony). The operation modes may also dictate different reverse channel transmit power levels, also allowing for battery life conservation.

Figure 3:
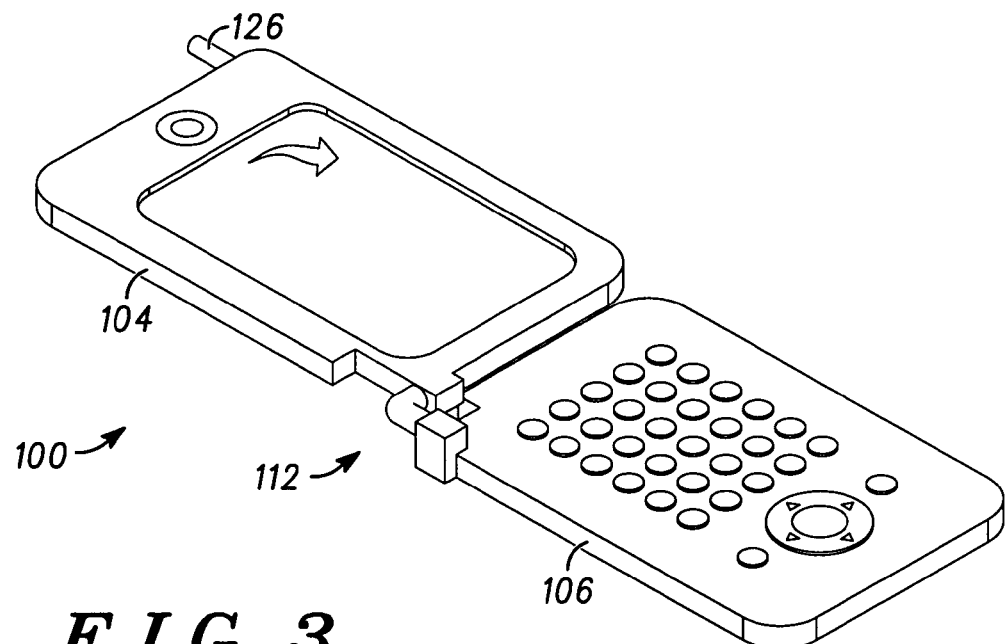
Figure 7:
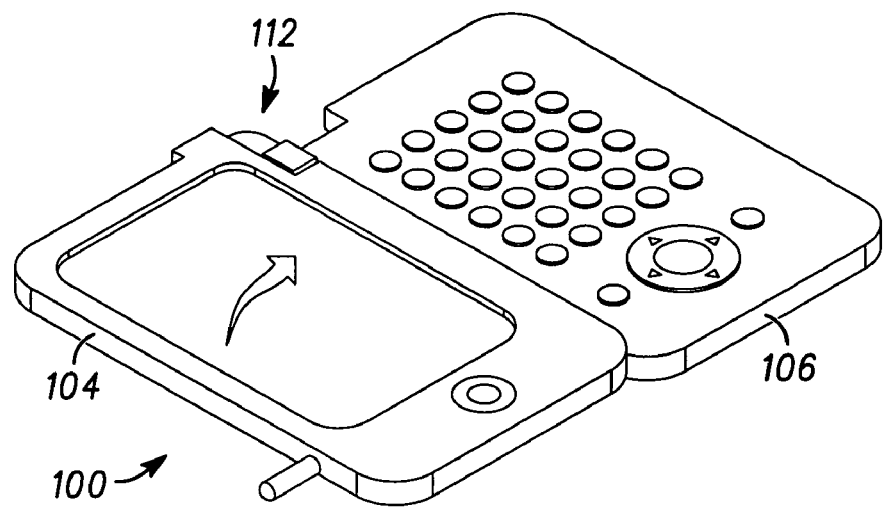

Still further, altering the configuration and operation mode of the device results in the need to align the antenna for optimum RF operation, typically in a vertical polarization. As shown in FIG. 7, when the device is configured in a landscape orientation the antenna will need to be in a first position extending the antenna in a optimum RF polarization as the device is operated by the user. FIG. 3 shows operation of the device configured in a portrait orientation, such as a cellular phone .

FIG. 9 shows detail of a first embodiment of the joint 112 of the present invention. The joint 112 includes a first fixed element 909 attached to the first electronic element 104, a second fixed element 909 attached to the second electronic element 106, and a connector element 903. The connector element 903 rotatably attaches to and connects the two fixed elements 909, and allows the first electronic element 104 to rotate in two planes with respect to the second electronic element 106.

Figure 10:
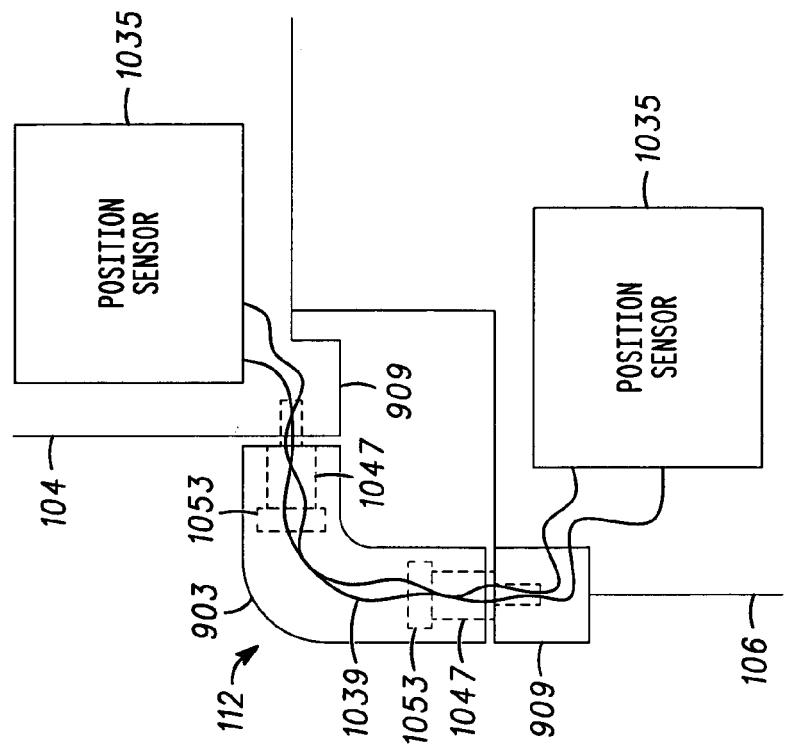
FIG. 10 shows a first joint embodiment along with a positional sensor device arrangement.

FIG. 10 shows the first joint embodiment along with a positional sensor device arrangement. Exemplary fixed elements 909 include a shaft 1047. A fixed element 909 is affixed to the first and second electronic elements 104 and 106, while the shaft 1047 is adapted to fit rotatably within an opening in the connector element 903. The fixed elements 909 (or the connector element 903) may include a retainer device, such as the ridge or ring 1053, for example, that allows the components to securely snap together.

The joint 900 may include one or more positional detents. This may be a ridge (not shown) on the shaft 1047 which may interact with grooves, etc., in the connector element 903 to provide fixed positional detents.

The fixed elements 909 each contain positional sensor devices (discussed below in conjunction with FIGS. 11-13) that interact with the connector element 903. The positional sensor devices are each connected to corresponding position sensor circuit boards 1035, and are therefore capable of determining a relative rotational position of each electronic element with respect to the connector element 903. When possessing data from both positions sensors and both position sensor circuit boards 1035, the portable electronic device 100 can determine a relative position of the first electronic element 104 with respect to the second electronic element 106.

Also shown in the figure is a bus 1039. The bus 1039 may pass through a hollow interior of the fixed elements 909 and a hollow interior of the connector element 903, and may be a single wire or lead, or a plurality of wires or leads. A positional information from a position sensor may be transmitted over the bus 1039. In addition, the bus 1039 may conduct electrical power between the electronic elements. Alternatively, the data bus 1039 may be external to the three joint components.

Figure 11:
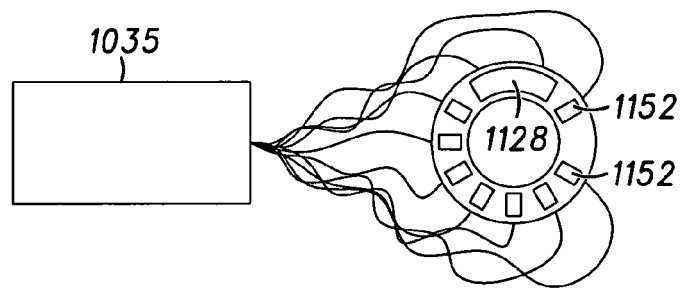
FIGS. 11-15 show various embodiments of a position sensor.
Figure 12:
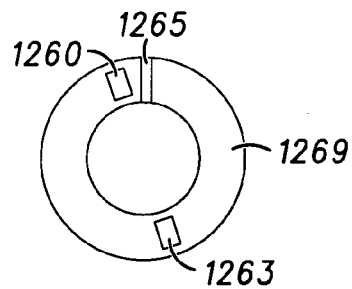
Figure 13:
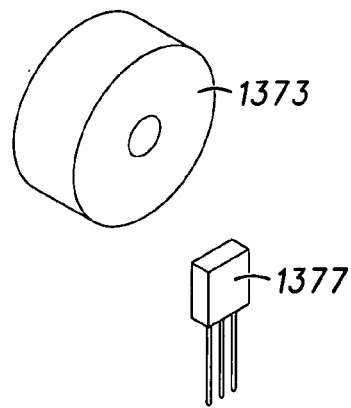

FIGS. 11-13 show various embodiments of the position sensor 932. FIG. 11 shows a first sensor embodiment wherein a face of a fixed element 909 may include a plurality of position sensor contacts 1152. A contact 1128 on the connector element 903 (only the contact 1128 is shown for clarity) may bridge pairs of position sensor contacts 1152, giving the corresponding position sensor circuit board 1035 a closed electrical circuit that may be used to determine a relative position of an electronic element 104 or 106. Due to the design of this sensor embodiment, only one pair of position sensor contacts 1152 may form a closed circuit at any time.

FIG. 12 shows a second sensor embodiment, wherein the position sensor comprises a variable resistor. The position sensor includes a fixed contact 1260, a resistive surface 1269, and a gap 1265 in the resistive surface 1269, all formed on a fixed element 909. A moving contact 1263 is affixed to the connector element 10003 (the connector element 903 is not shown for clarity). In use, the moving contact 1263 may rotate on the position sensor as the corresponding electronic element is moved. It should be understood that a wire or other lead must therefore extend from the moving contact 1263 to the position sensor circuit board 1035 (not shown). The resistance received by a corresponding position sensor circuit board 1035 will therefore vary according to the rotation of the position sensor.

The above description places the variable resistor on a fixed element 909. However, the variable resistor could alternatively be formed on an end of the connector element 903, with the moving contact 1263 being formed on a fixed element 909.

FIG. 13 shows a third sensor embodiment, wherein the position sensor comprises a magnet 1373 and a Hall Effect sensor 1377. The magnet 1373 is preferably affixed to an end of the connector element 903, and the Hall Effect sensor 1377 is affixed to or embedded in a fixed element 909. The magnet 1373 may be comprised of multiple magnetic north and south poles, and may be comprised of multiple magnets or magnetic poles of different strengths and orientations.

The Hall Effect sensor 1377 generates an electrical signal when in a magnetic field. The corresponding position sensor circuit board 1035 may use this electrical signal to determine a relative position.

Figure 14:
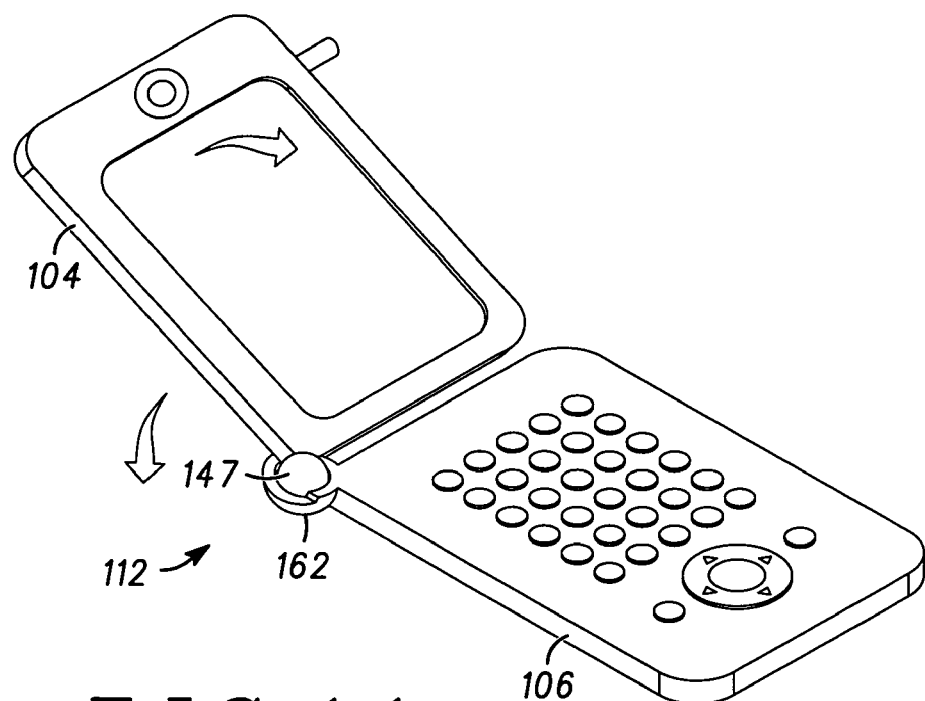
Figure 15:
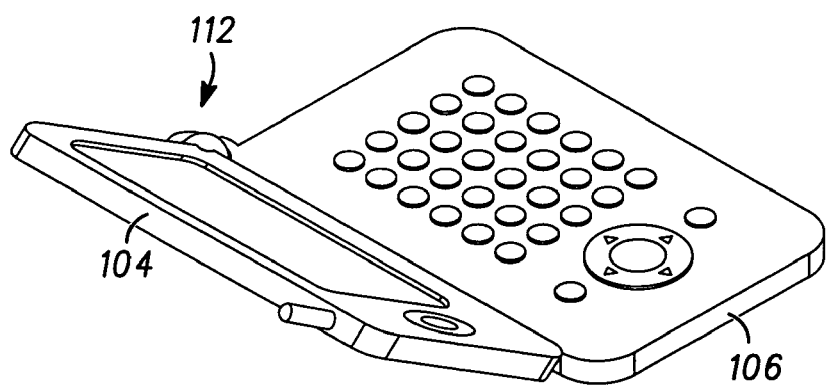

FIGS. 14-15 show a second embodiment of the joint 112. In the second embodiment, the joint 112 is a ball type joint having a ball 147 attached to either the first or second elements. In a preferred embodiment, the ball 147 is attached to the first element 104. The ball 147 may optionally include a shaft 137 (see FIG. 20). The ball 147 is rotatably received in a socket 162 formed in the second element 106. The joint 112 therefore allows movement of the first element 104 in two planes in relation to the second element 106.

FIGS. 16-18 show detail of the socket 162. FIGS. 17 and 18 are views of FIG. 16 but from left and right sides, showing angle cuts (detents) designed to hold the two elements in predetermined positions for portrait and landscape configurations.

FIG. 19 shows the two resulting predetermined positions of the first element 104 in relation to the second element 106.

FIG. 20 shows detail of the ball 147 and the socket 162. The ball 147 comprises at least two conductors 151 and 153, although more than two conductors could be employed. The two conductors 151 and 153 are separated by a strip of electrically insulating material 148. The optional shaft 137 also includes conductive regions 141 and 143, with the conductive regions 141 and 143 ending in the conductors 151 and 153 of the ball 147. A voltage potential may be placed across the two conductive regions 151 and 153 of the ball 147. A plurality of contacts 159 in the socket 162 press against the ball 147 in a spring-like fashion, and conduct electricity between the ball 147 and the second element 106. The plurality of contacts 159 may therefore be used to sense the position of the first element 104 in relation to the second element 106 by determining which contacts of the plurality of contacts 159 are conducting electricity. The conductive regions and the contacts therefore allow the portable electronic device 100 to sense the relative position by determining which contact(s) receives the voltage of conductor 151 and which contact(s) receives the voltage of conductor 153. The positional measurement resolution may be determined by the relative sizes (and numbers) of the conductive regions 151 and 153 of the ball 147, and also by the size, number, and placement of contacts 159.

Not only is the relative position sensed, but also electrical power may be transferred between the first element 104 and the second element 106 via the various embodiments of the joint 112. This is desirable because a power source is preferably located in only one of the two elements 104 or 106.

When the ball 147 is rotated, it may be possible that conductors 151 and 153 may be connected together, creating a short circuit. This may be prevented by the inclusion of a current sensing device that shuts down electrical power to the conductors 151 and 153 when a short circuit is detected. When the short circuit is removed, (i.e., the ball 147 is rotated further), the current sensing device may re-apply power.

A further advantage of the ball joint socket and associated contacts is that a two-way digital communication may be performed through the joint 112. This two-way electrical communication may be accomplished by superimposing a digital signal on top of the DC power voltage level (electrical power) existing across the conductive elements 151 and 153 of the joint 112.

FIG. 21 shows a graph of a communication signal superimposed on the power voltage, while FIG. 22 shows the digital communication signal removed from the power voltage. The communication signal may be removed from the power voltage after the ball joint by using a capacitor to remove the DC component, leaving only the communications signal.

Moving to FIGS. 23 and 24, a self configuring multiple element wireless portable electronic communication device is shown. The embodiment comprises a housing 2300 having a first element 2302 and a second element 2304. The housing 2300 further comprises a keyboard 2306 having a plurality of keys. The keyboard 2306 may be disposed on said first element 2302. The housing 2300 further comprises a sensor (not shown) disposed in said housing 2300 and detecting a relative position of said first element 2302 relative to said second element 2304. Finally, the housing comprises a keyboard controller (not shown), the keyboard controller coupled to the sensor, wherein a first set of keys 2308, of said plurality of keys of said keyboard 2306 are activated by said keyboard controller in response to said first element 2302 being in a first position 2310 relative to said second element 2304.

The device has at least two operational modes wherein the device self configures an operational mode based on a position of said first element 2302 relative to said second element 2304. The device further comprises a second set of keys 2312 of said plurality of keys of said keyboard 2306 which are activated by the keyboard controller in response to the first element 2302 being in a second position 2402 relative to said second element 2304. Even further, the first set of keys 2308 is a subset of said second set of keys 2312. The first set of keys 2308 may be the same shape as the second set of keys 2312 or they may have a different shape than the second set of keys 2312.

The first set of keys 2308, of the plurality of keys, has a first set of indicia 2316 associated therewith, and the first set of indicia 2316 correspond to a first operation mode of said at least two operational modes. The second set of keys 2312 has a second set of indicia 2318 associated therewith, and the second set of indicia 2318 correspond to a second operation mode of the at least two operational modes. The first set of indicia 2316 are oriented at approximately a 45 degree angle relative to said second set of indicia 2318, such that said second set of indicia 2318 can be read when said device is configured in said first position and said second position. The first set of keys 2308 are active when the device is configured in a first mode as a portrait display mode such that said second element is configured as a portrait display position 2320. The second set of keys 2312 are active when said device is configured in a second operation mode as a landscape display mode such that said second element 2304 is configured as a landscape display position 2402. The first set of keys 2308 may comprise a first shape. This first shape 2322 may comprise a circle or square. The second set of keys 2312 comprises a second shape 2324, which is different than said fist shape 2322. The second shape 2324 may be an oval, rectangle or pill, or a larger circle or square than used for the first set of keys 2306. The indicia may be disposed on the keys or the indicia may be disposed adjacent to said keys. One set of indicia may be disposed on the keys while the other set of indicia may be disposed adjacent to the keys.

The second element 2302 may include a display device capable of being configured as a landscape display device and a portrait display device.

While the invention has been described in detail above, the invention is not intended to be limited to the specific embodiments as described. It is evident that those skilled in the art may now make numerous uses and modifications of and departures from the specific embodiments described herein without departing from the inventive concepts.

We claim:

1. A self configuring multiple element wireless portable electronic communication device, comprising:
   a housing having a first element and a second element;
   a keyboard, having a plurality of keys, said keyboard disposed on said first element;
   a display disposed on the second element;
   a sensor disposed in said housing and detecting a relative position of said first element relative to said second element; and
   a keyboard controller disposed in said housing, said keyboard controller coupled to said sensor; and
   wherein a first set of keys, of said plurality of keys of said keyboard correspond to a first operation mode in response to said first element being in a first position relative to said second element, and
   wherein the first set of keys, of said plurality of keys of said keyboard correspond to a second operation mode in response to said first element being in a second position relative to said second element.

2. The device of claim 1, wherein said device self configures to one of the first operation mode or the second operation mode based on a position of said first element relative to said second element.

3. The device of claim 2, wherein a second set of keys of said plurality of keys of said keyboard are activated by said keyboard controller in response to said first element being in a second position relative to said second element.

4. The device of claim 3, wherein said first set of keys is a subset of said second set of keys.

5. The device of claim 4, wherein said first set of keys has a different shape than said second set of keys.

6. The device of claim 2, wherein said first set of keys, of said plurality of keys, has a first set of indicia associated therewith, and
wherein said first set of indicia correspond to a first operation mode of said at least two operational modes.

7. The device of claim 3, wherein said second set of keys has a second set of indicia associated therewith, and
wherein said second set of indicia correspond to a second operation mode of said at least two operational modes.

8. The device of claim 6, wherein said first set of indicia are oriented at approximately a 45 degree angle relative to said second set of indicia, such that said second set of indicia can be read when said device is configured in said first position and said second position.

9. The device of claim 8, wherein said first set of keys are active when said device is configured in a first mode as a portrait display mode such that said second element is configured as the portrait display position; and
wherein said second set of keys are active when said device is configured in a second operation mode as a landscape display mode such that said second electronic element is configured as a landscape display position.

10. The device of claim 1, wherein said first set of keys comprise a first shape.

11. The device of claim 10, wherein said first shape is a circle or square.

12. The device of claim 3, wherein said second set of keys comprises a second shape.

13. The device of claim 12, wherein said second shape is an oval, rectangle or pill.

14. The device of claim 7, wherein said indicia are disposed on said keys.

15. The device of claim 7, wherein the indicia are disposed adjacent to said keys.

16. The device of claim 6, wherein said indicia are disposed on said keys.

17. The device of claim 6, wherein the indicia are disposed adjacent to said keys.

18. The device of claim 1, wherein said second element includes a display device capable of being configured as a landscape display device and a portrait display device.

19. A handheld communications device, comprising:
a housing;
a panel movably coupled to the housing, the panel movable between at least first and second positions;
a plurality of input keys disposed on one of the housing or the panel,
at least some of the plurality of input keys perform a first function when the panel is in the first position,
the same at least some of the plurality of input keys perform a second function, different than the first function, when the panel is in the first position; and
a first set of indicia associated with the same at least some of the plurality of input keys, oriented at approximately a 45 degree angle relative to a second set of indicia associated with the plurality of keys, such that said second set of indicia can be read when said device is configured in said first position and said second position.

20. The device of claim 19, the plurality of input keys comprise a qwerty keypad when the panel is in the first position, the same at least some of the plurality of input keys are a numeric keys when the panel is in the second position.

21. The device of claim 19, at least some of the plurality of input keys comprise a qwerty keypad when the panel is in the first position, some of the plurality of input keys comprising the qwerty keypad having a numeral associated therewith, the plurality of input keys having a numeral associated are numeric input keys when the panel is in the second position.

22. The device of claim 21, the plurality of input keys comprising the qwerty keypad each having an alphabetic character associated therewith, the numerals inclined at said angle of approximately 45 degrees relative to the alphabetic characters.

23. A-method for self configuring an operational mode in a self configuring multiple element wireless portable electronic communication device, said self configuring multiple element portable electronic device having a first electronic element that may be moved in relation to a second electronic element, and a keyboard having a plurality of keys therein, the method comprising the steps of:
detecting a relative position of said first electronic element relative to said second electronic element; and
selecting an operational mode of said keyboard based on said relative position;
activating the first set of keys of the keyboard when the device is configured in a first operational mode as a portrait display mode wherein a first set of indicia associated with the first set of keys are oriented at approximately a 45 degree angle relative to a second set of indicia,
and wherein said second element is configured as a portrait display position; and
activating a second set of keys of the keyboard when said device is configured in a second operation mode as a landscape display mode such that said second element, is configured as a landscape display position wherein the second set of indicia are associated with the second set of keys.

24. The method of claim 23, activating a first set of keys in response to said operating mode being a portrait entry mode.

25. The method of claim 23, activating a second set of keys in response to said operating mode being a landscape entry mode.

* * * * *